Figure 1:
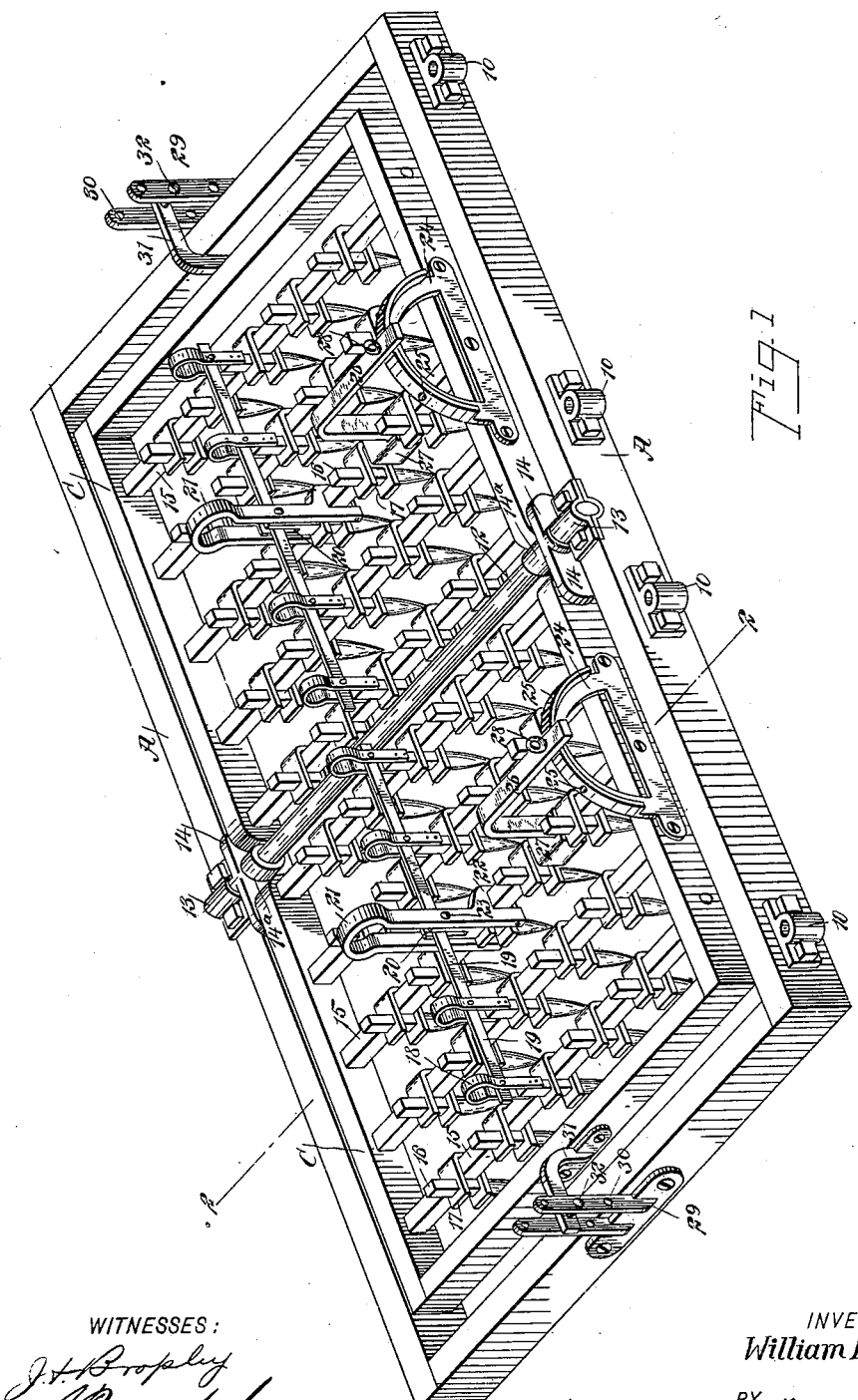

No. 665,721. Patented Jan. 8, 1901.
W. M. BAKER.
HARROW.
(Application filed Apr. 14, 1900.)
(No Model.) 2 Sheets—Sheet 1.

WITNESSES:

INVENTOR
William M. Baker.
BY
ATTORNEYS

No. 665,721. Patented Jan. 8, 1901.
W. M. BAKER.
HARROW.
(Application filed Apr. 14, 1900.)
(No Model.) 2 Sheets—Sheet 2.
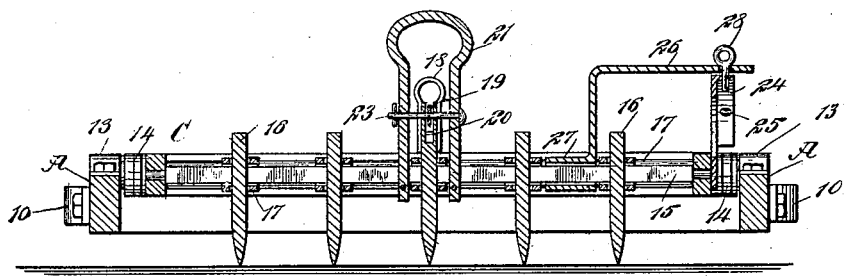
Fig. 2
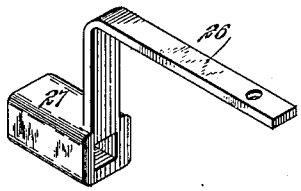
Fig. 3
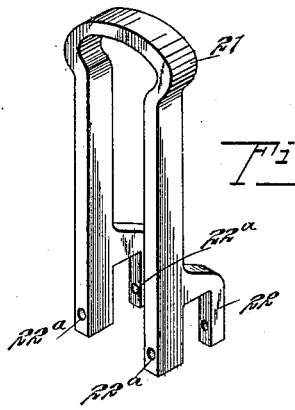
Fig. 4
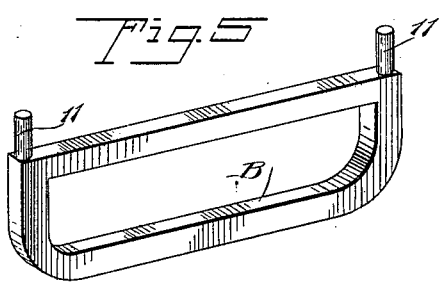
Fig. 5
WITNESSES:
J. A. Brophy
Fred Acker
INVENTOR
William M. Baker.
BY 
ATTORNEYS

UNITED STATES PATENT OFFICE.

WILLIAM M. BAKER, OF FORTVILLE, INDIANA, ASSIGNOR OF ONE-HALF TO CORYDON M. RICH AND JAMES G. THOMAS, OF MUNCIE, INDIANA.

HARROW.

SPECIFICATION forming part of Letters Patent No. 665,721, dated January 8, 1901.

Application filed April 14, 1900. Serial No. 12,828. (No model.)

*To all whom it may concern:*

Be it known that I, WILLIAM M. BAKER, a citizen of the United States, and a resident of Fortville, in the county of Hancock and State of Indiana, have invented a new and Improved Harrow, of which the following is a full, clear, and exact description.

One purpose of the invention is to so construct a harrow that the frame will contain pivoted tooth-carrying sections or wings independently adjustable and means whereby runners may be attached to the main frame, enabling the harrow to be taken to and from a field without the teeth being brought into action.

Another purpose of the invention is to provide devices which will enable an operator to quickly and conveniently adjust the outer ends of the toothed wings or sections either upward or downward and also to so mount the rows of teeth in the wings that said teeth may be given different inclinations and to provide means for adjusting the various rows of teeth and holding them in adjusted positions.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved harrow. Fig. 2 is a transverse section taken practically on the line 2 2 of Fig. 1, and Figs. 3, 4, and 5 are perspective detail views of parts of the harrow.

The main frame A of the harrow is preferably rectangular, as illustrated in Fig. 1, and this main frame is also preferably provided at its sides with castings or forgings 10 in the nature of sockets, and these sockets are adapted to receive studs 11, which extend upward from runners B, one of which is shown in Fig. 5, and these runners are attached to the main frame A through the medium of the said sockets when the harrow is to be carried to or from a field and serve to prevent the teeth at such time from engaging with the ground. A shaft 12 is transversely placed at the central portion of the main frame A, being journaled in suitable bearings 13, carried in the said frame, and sleeves 14$^a$ are mounted on the shaft 12, one near each end. These sleeves carry forward and rearward projections 14. The projections 14 are attached to the side pieces of inner or auxiliary frames C, which frames are virtually wings or sections of the harrow and are adapted to support and carry the teeth of the harrow. To that end bars 15 are mounted to turn in the sides of the wings of the auxiliary frames C, and preferably the said bars between the sides of the wings or auxiliary frames are rectangular in cross-section, the teeth 16 being secured on the said bars by means of suitable clamps 17.

The central tooth of each bar 15 in each wing or section C, with the exception of the central tooth on the central bar of each section, is secured in any suitable or approved manner to a yoke 18, and the yokes 18 of each tooth-carrying section or wing are attached to a common rod 19. By moving the rod 19 endwise the tooth-carrying bars may be turned so as to present the teeth at any desired angle to the surface of the ground, but the central tooth of the central tooth-carrying bar 15 of each section or wing C is preferably carried up a greater distance than the other teeth and is provided with a slot 20 in its upper end, through which the connecting-bar 19 of the section or wing passes, and a larger yoke 21 is provided for the central tooth of the central bar 15 of each section. This larger yoke 21 is adapted as a handhold for the operator, and through its use the connecting-bar 19 to which it is attached is given end movement.

As shown in Fig. 1, each larger yoke 21 is provided with a shoe 22, which shoe fits over the central tooth-carrying bar 15 of a section, as shown in Fig. 1, and a pin 23 is passed through each of the larger or manipulating yokes 21 and through the upper end of the slotted central tooth of such section or wing.

It will be observed that when a manipulating-yoke 21 is moved in direction of the ends of the harrow all of the toothed bars of the section to which the said yoke belongs will be simultaneously moved, and in order to lock all the toothed bars of a section in their adjusted positions a segment 24 is secured to the side portion of each wing or auxiliary frame C, and each segment is preferably provided with three or more apertures 25 in its rim. The upper end of an angle-bar 26 extends over the rim of each segment, and each angle-bar 26 is provided at its bottom with a socket-section 27, which is fitted closely to the central tooth-carrying bar 15 of the wing or auxiliary frame to which the angle-bar belongs, and a pin 28 is adapted to be passed through an opening in the upper member of the angle-bar 26 and into any one of the apertures 25 in the segments 24 over which the said member of the angle-bar moves, so that the teeth may be held in practically three positions—a vertical position, or at angle inclining inward toward the center of the harrow, or outward in direction of an end.

In addition to the adjustment of the tooth-carrying bars in the wings or auxiliary sections C of the harrow each wing or auxiliary frame C is independently adjustable at its outer end, and such adjustment is accomplished, preferably, by attaching standards 29 to the end portions of the main frame A, the standards having transversely alining apertures 30 made therein, and an angle-arm 31 is attached to the end of each wing or auxiliary frame C, a member of each of which arms is adapted to enter the space between a pair of standards 29, and by passing pins 32 through the standards 29 and the entering members of the angle-arms 31 the outer ends of the wings or auxiliary frames C may be held in an upper or in a lower position and the wings be made to accommodate themselves to the character of the ground over which the harrow is to pass.

Having thus described my invention, I claim as new and desire to secure by Letters Patent—

1. In a harrow, the combination with a frame, of tooth-carrying bars pivoted in the frame, a shifting bar connected with the tooth-carrying bars, a segment attached to the frame, and a latch-bar attached to one of the tooth-carrying bars, and adapted for locking connection with the segment, substantially as described.

2. In a harrow, the combination with a frame and tooth-carrying bars pivoted in the frame, of extensions to sundry of the central teeth in the frame, a connecting-bar attached to the said extensions of the teeth, a segment attached to the frame and a latch-bar attached to one of the tooth-carrying bars, which latch-bar extends over and is adapted for locking connection with the segment, substantially as described.

3. In a harrow, the combination, with a main frame, auxiliary frames pivotally attached to the main frame near a central point in the same, and tooth-carrying bars pivoted in the auxiliary frames, of extensions to sundry of the central teeth in the auxiliary frames, a connecting-bar provided for each auxiliary frame, being attached to the said extensions of the teeth of the auxiliary frames, segments attached to the auxiliary frames, and latch-bars attached to one of the tooth-carrying bars in each auxiliary-frame section, which latch-bars extend over and are adapted for locking connection with the segments, for the purpose set forth.

4. In a harrow, the combination, with a main frame, of a pivoted auxiliary frame, tooth-carrying bars pivoted in the auxiliary frame, yokes attached to the central teeth of the said bars, the central yoke having a shoe which is fitted to the bar supporting it, an apertured segment attached to a side of the auxiliary frame, an arm secured to one of the tooth-carrying bars, which arm extends over the segment, and a device for locking the arm to the segment, as specified.

5. In a harrow, a frame, pivoted tooth-carrying bars, yokes attached to the central teeth of said bars, a connecting-bar attached to said yokes, an angle-bar secured to one of the tooth-carrying bars, and means for adjustably locking the angle-bar, substantially as described.

6. In a harrow, a frame, tooth-carrying bars pivoted in the frame, a yoke having a shoe at its lower end fitting one of said tooth-carrying bars, the upper end of said yoke being adapted for a handhold, and a shifting bar connected with said yoke and the tooth-carrying bars, as set forth.

7. In a harrow, the combination, with a main frame, of a pivoted auxiliary frame, tooth-carrying bars pivoted in the auxiliary frame, yokes attached to the central teeth of the said bars, the central yoke having a shoe which is fitted to the bar supporting it, an apertured segment attached to a side of the auxiliary frame, an arm secured to one of the tooth-carrying bars, which arm extends over the segment, a device for locking the arm to the segment, and means for adjusting the outer end of the auxiliary frame, as set forth.

8. In a harrow, the combination with a main frame, auxiliary frames pivoted in the main frame and means for adjusting the auxiliary frames, of tooth-carrying bars pivoted in the auxiliary frames, a shifting bar connected with the tooth-carrying bars of each auxiliary frame, a segment secured to one side of each auxiliary frame, a latch-bar attached to one of the tooth-carrying bars in each auxiliary frame, and means for adjustably locking the latch-bars to the segments, substantially as described.

In testimony whereof I have signed my name to this specification in the presence of two subscribing witnesses.

WILLIAM M. BAKER.

Witnesses:
FRANK W. BREWSTER,
ARDEN H. THOMAS.